United States Patent [19]

van der Lely

[11] Patent Number: 4,618,016
[45] Date of Patent: Oct. 21, 1986

[54] MOTOR VEHICLE SUCH AS A TRACTOR

[76] Inventor: Cornelis van der Lely, 7 Brüschenrain, Zug, Switzerland

[21] Appl. No.: 576,019

[22] Filed: Feb. 1, 1984

[30] Foreign Application Priority Data

Feb. 7, 1983 [NL] Netherlands ............... 8300453

[51] Int. Cl.⁴ .................. B60K 25/08; F16H 37/00
[52] U.S. Cl. ................. 180/53.6; 180/53.7; 180/312; 74/11; 74/15.6; 74/15.86
[58] Field of Search ............ 180/53 FE, 53.3, 53.4, 180/53.6, 53.8, 312, 900, 53.7, 53.62, 53.61; 74/11, 15.2, 15.63, 15.6, 15.86

[56] References Cited

U.S. PATENT DOCUMENTS

| | | | |
|---|---|---|---|
| 2,287,279 | 6/1942 | Stumpt | 74/15.2 |
| 2,352,270 | 6/1944 | Land et al. | 74/11 |
| 2,838,940 | 6/1958 | Swenson et al. | 74/15.2 |
| 4,084,485 | 4/1978 | van der Lely | 91/210 |
| 4,171,028 | 10/1979 | van der Lely | 180/235 |
| 4,525,987 | 7/1985 | Werner et al. | 74/15.2 |

FOREIGN PATENT DOCUMENTS 2039667 8/1970 Fed. Rep. of Germany .
7604307 4/1976 Netherlands .

Primary Examiner—Larry Jones
Attorney, Agent, or Firm—Penrose Lucas Albright, Pravel, Gambrell, Hewitt & Kimball

[57] ABSTRACT

A tractor has a hydraulically driven PTO shaft disposed at one side and generally centrally so that it can be connected to an input shaft of an implement extending laterally from the tractor's rear lifting device. The tractor's engine is between its wheels and its drive shaft is transverse to the tractor's longitudinal centerline. The width of the engine is less than the width from outboard side to outboard side of the tractor's front wheels. The fuel tank is offset on one side of the tractor opposite the aforesaid PTO. The front wheels of the tractor are situated within the tracks of the rear wheels so that the tracks do not overlap and are about equal distances apart. All wheels are driven by individual hydraulic motors. Hydraulic motors also drive the aforesaid PTO shaft and two further PTO shafts which extend to the tractor's rear, one centered with respect to the tractor's three-point lifting device and the other to one side thereof. An alarm alerts the operator if the power required for the tractor's propulsion is a disproportionate share of that available whereby there is insufficient power for the aforesaid or other PTO shafts and any implements connected thereto. The hydraulic fluid which drives the wheels can be delivered to the front or rear wheels either in series to ensure both wheels are powered or in parallel.

35 Claims, 6 Drawing Figures

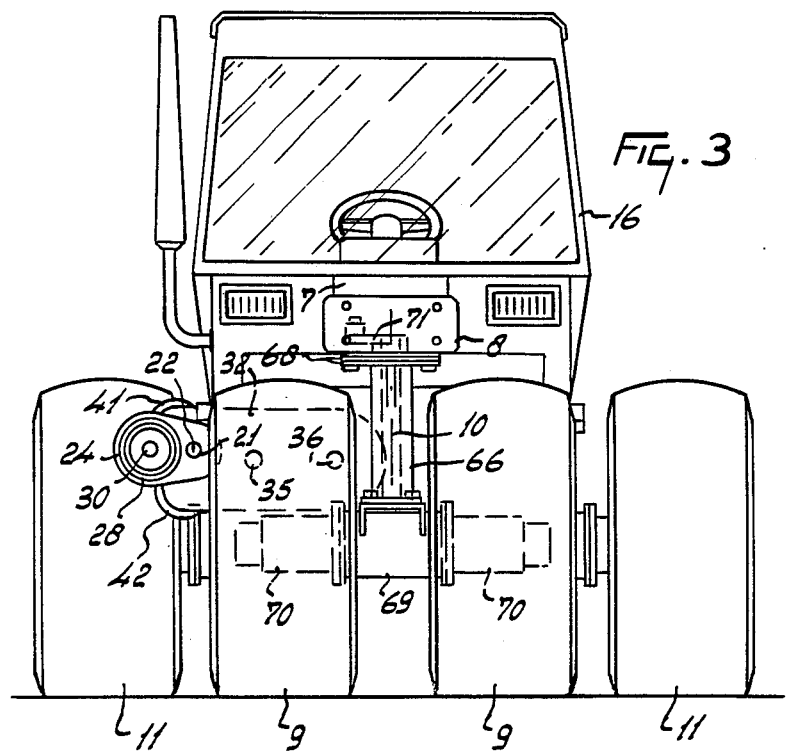
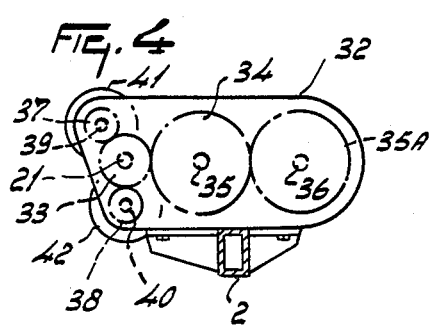
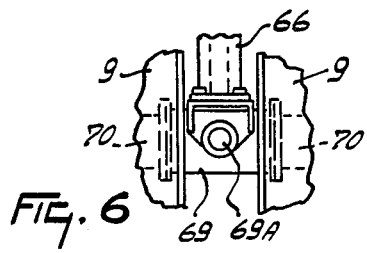
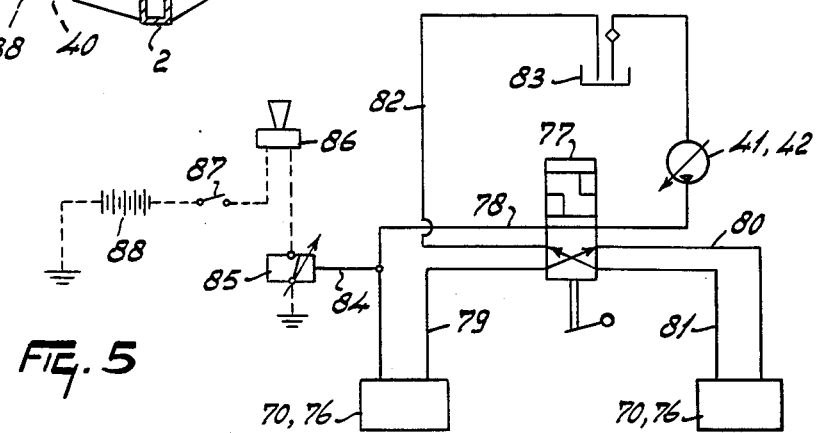

MOTOR VEHICLE SUCH AS A TRACTOR

BACKGROUND OF THE INVENTION AND PRIOR ART

This invention relates to a motor vehicle and particularly although not exclusively to a tractor for agricultural purposes.

Tractors are known which comprise an engine, a frame, a lifting device and a power take-off shaft, but they have the disadvantage that the power take-off shaft is located in or near the vertical longitudinal central plane of the tractor and so can be coupled by means of an auxiliary shaft with machines running for the major part at the side of the tractor track (i.e. working in a mitering position) only if the machine is provided at one end with an input shaft, so that these machine are not adapted to be driven symmetrically with respect to the tractor.

Machines having an input shaft in the middle of their effective width cannot readily be directly coupled with the power take-off shaft of a known tractor if they are to extend to one side of the tractor because the auxiliary shaft would have to be at a very large angle to the longitudinal plane of the tractor or the machine would have to be arranged at a relatively large distance from the tractor. This limits the versatility of machines attachable to a tractor or it compels the machine manufacturer to design two versions of each machine, one having an input shaft in the middle of the effective width and the other having an input shaft at one end of the effective width.

Examples of such machines are cultivators, harrows, weeders (for example, for orchards), while loading wagons operating in the mitering position also give rise to problems.

BRIEF SUMMARY OF THE INVENTION

According to the present invention, there is provided a motor vehicle comprising an engine, a frame, at least one lifting device and a power take-off shaft which is drivable by the engine and which extends in the intended direction of normal operative travel of the vehicle and is disposed at one side of the vehicle.

With such a construction, it can be ensured that machines having a central input shaft can be driven at the side of the tractor without limiting the possibility of use in the case of a symmetrical disposition with respect to the tractor.

BRIEF DESCRIPTION OF THE DRAWINGS

FIG. 3 is a front view of the tractor of FIGS. 1 and 2;

FIG. 4 is a schematic sectional view taken on the line IV—IV in FIG. 2;

FIG. 5 is a diagram representing hydraulic drive circuitry of the tractor; and

FIG. 6 is a fragmentary view corresponding to part of FIG. 3 but showing an alternative construction.

DETAILED DESCRIPTION OF A PREFERRED EMBODIMENT

Figure 1:
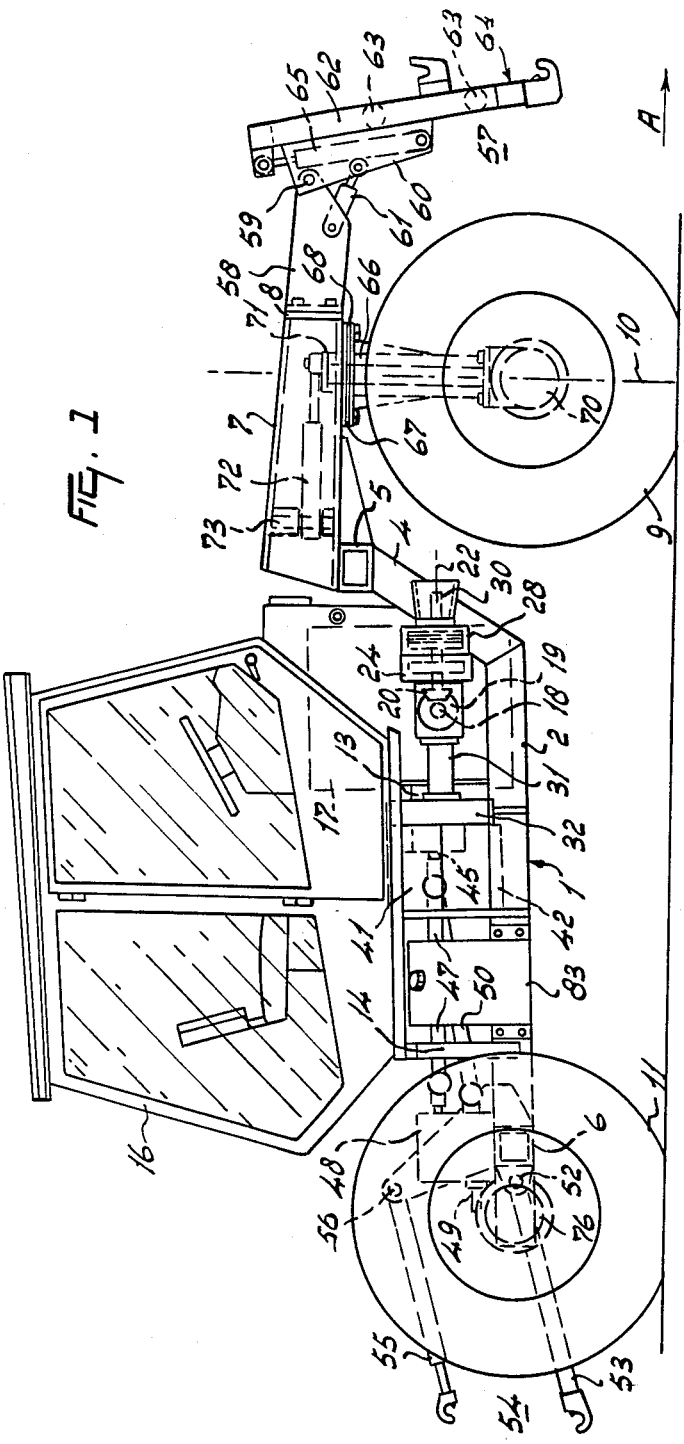
FIG. 1 is a side view of a tractor.
Figure 2:
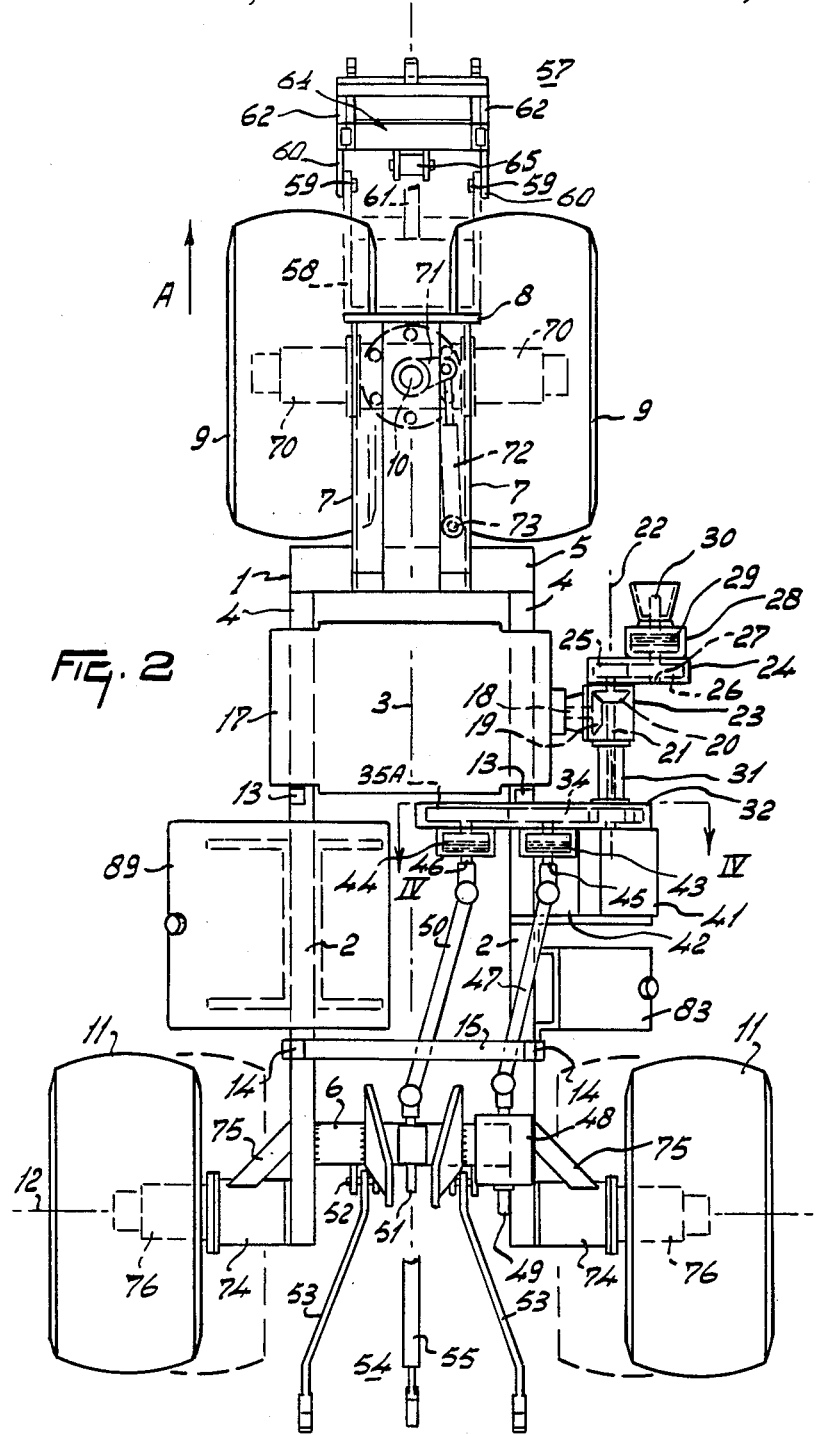
FIG. 2 is a plan view of the tractor of FIG. 1, with parts omitted.

The tractor shown in FIGS. 1 and 2 comprises a frame 1 having two hollow, box-section frame beams 2 disposed side by side and some distance apart from each other, one on each side of a vertical central plane 3 of the tractor. Each of the two frame beams 2 is provided with an extension which projects forwardly, with respect to the intended direction A of operative travel of the tractor. Each extension comprises a hollow profile which is rigidly secured to the front end of the frame beam 2 concerned and slopes upwardly and forwardly. Each extension 4, as viewed on plan, is in line with its frame beam 2. The two hollow profiles 4, whose length is about 25 to 30% of the length of the frame beams 2 and which, as seen from the side, are at an angle of about 45° to their frame beams 2, are rigidly interconnected at their upper ends by a horizontal tie beam 5, which is normal to the plane 3. At a short distance in front of their rear ends, the frame beams 2 are interconnected by a hollow beam 6 which is normal to the plane and is rigidly secured at its ends to the frame beams 2.

Two channel-section carriers 7 are rigidly secured to the top of the beam 5. These carriers 7 extend forwardly from the beam 5 with respect to the direction A. The open sides of the carriers 7 face each other, and the carriers are situated one on each side of, and at equal distances from, the plane 3. The distance between the outboard webs of the carriers 7 is about half the length of the tie beam 5, measured at right angles to the plane 3. At their front ends, the carriers 7 are rigidly interconnected by a vertical tie plate 8 which is normal to the plane 3.

Viewed on plan the length of the extensions 4 and the carriers 7, measured in the direction A, is in total equal to about half the length of the frame beams 2.

In the free space at the front ends of the extensions 4 and below the carriers 7, as viewed in FIG. 1, there is a set of two front wheels 9 which are provided with low pressure pneumatic tires. Viewed on plan (FIG. 2), part of the tyre of each wheel 9 is disposed below one of the carriers 7. The two front wheels 9 are disposed close to each other. The distance between the two tires is smaller than one quarter of the diameter of each tire. The two front wheels 9 are pivotable together in a manner to be described later in this description about an upwardly directed pivotal shaft 10, which is located in the plane 3.

The tractor is provided with two rear wheels 11, which are arranged one on each side of the plane 3 and which are rotatable about a wheel axis 12 which is located, as viewed in FIG. 1, near the rear ends of the frame beams 2 and which is directed at right angles to the plane 3.

The two rear wheels 11 and the two front wheels 9 have the same diameters as each other, this being about 135 centimeters. The width of the pneumatic tyres, which are low pressure tires on all wheels, is about sixty centimeters. The rear wheels 11, which are arranged on the outboard sides of the frame 1, are spaced apart by a distance such that the tracks of the two front wheels 9 are within those of the rear wheels 11 (see FIG. 3) so that the overall width by which the tractor bears on the ground is at least about 240 centimeters. The low pressure tires will bulge out considerably near the ground owing to the ground pressure. This results in a large ground contact surface and a relatively low ground pressure. Also, since each wheel has a track which does not coincide with that of another wheel, it is ensured that deterioration of the soil structure with regard to the growth of plants is avoided.

The frame beams 2 are provided with front supports 13 and rear supports 14 (which are interconnected by a horizontal carrying beam 15 normal to the plane of symmetry 3), on which bears a cab 16. As viewed from the side, the cab 16 extends from a region above the extensions 4 to above the front half of the rear wheels 11, and viewed on plan or from the front (FIG. 3), the cab extends beyond the outer faces of the front wheels 9. From the cab the driver can steer the front wheels 9 and control the drive of the tractor as well as control all further functions of the tractor, for example, those of the power take-off shafts to be described later in this description. The cab floor is located at a lower level than the carriers 7.

In the region between the front wheels 9 and the rear wheels 11 there is a combustion engine 17, preferably an air-cooled Diesel engine, which bears on the front parts of the frame beams 2 and which is suported by the extensions 4 of the frame beams. The engine 17 is located partly inside the cab 16. The engine 17 is positioned near the rear of the front wheels 9. The driving engine 17 is disposed so that its crankshaft extends transversely of the plane 3 so that an output shaft 18 of the driving engine 17 projects to one side of the tractor. The shaft 18 is provided with a bevel gear wheel 19, which, as viewed in the direction A, is substantially parallel to the plane 3 and is disposed approximately in a plane containing the outer boundary face of the front wheel 9 located on the same side of the tractor. The gear wheel 19 is in mesh with a bevel gear wheel 20 mounted on a shaft 21 which extends horizontally and parallel to the plane 3. The shaft 21 has a centerline 22, which is near the said boundary face of the front wheel. The gear wheels 19 and 20 are situated inside a housing 23, which is rigidly secured with respect to the engine 17. On the front of the housing 23 there is a housing 24 in which two meshing spur gear wheels 25 and 26 are accommodated. The gear wheel 25 is fastened to the shaft 21. In the position shown (FIG. 2) the gear wheel 26, which is fastened to a shaft 27, is disposed on the outboard side of the gear wheel 25 with respect to the plane 3. In the region of the gear wheel 26 and its shaft 27 there is a coupling housing 28 which is rigidly secured to the front of the housing 24. The housing 28 encloses a clutch 29 actuable from the cab 16 (for example, a hydraulically actuable plate coupling), the input shaft of which comprises the shaft 27. The output shaft 30 of clutch 29 constitutes a power take-off shaft of the tractor. The transmission ratios of said gear wheels are such that at a speed of rotation of the engine 17 of about 200 to 2200 rev/min the power take-off shaft 30 can be driven at a speed of aobut 1000 rev/min. The distance between the power take-off shaft 30 and the plane 3 is in the position shown about one hundred centimeters. As viewed from the front, the power take-off shaft is situated outwardly of the outer face of the adjacent front wheel 9 and, as viewed from the side, it is located above the underside of the frame 1 and above a horizotnal plane containing the axes of the wheels 9 and 11.

Machines or implements attached to the tractor and having a working width extending beyond the tractor as viewed in the direction A, can be driven from the power take-off shaft 30. It is not requisite that any auxiliary shaft coupled with power take-off shaft 30 be at a large angle to shaft 30. Viewed from the side, the power take-off shaft 30 is disposed in the region between the front wheels 9 and the rear wheels 11 and protrudes from one side of the tractor. In this embodiment the power take-off shaft 30 is directed to the front, but it is, of course, also possible to direct the power take-off shaft 30 to the rear and to arrange it near the rear of the tractor. In the latter case it is desirable, in view of the relatively large distance between the rear wheels 11, to cause the housings 23, 24 and 28 to protrude farther from the engine 17 so that the power take-off shaft 30 is disposed outwardly of a plane which is parallel to the plane 3 and which goes through a side face of the nearest rear wheel 11. In this connection, it is possible to design the above-mentioned drive train to the power take-off shaft 30 in a manner such that the housings 24 and 25 with the gear wheels and the coupling as well as the power take-off shaft 30 constitute a pivotable unit with respect to the housing 23, this unit being pivotable about the center line 22 of the shaft 21. By designing the unit 24 to 30 so that it is pivotable with respect to the housing 23 about the center line 22 and fixable in any one of a plurality of positions, it is possible to turn the power take-off shaft, for example when the unit is found to be troublesome during transport, to bring the registering center lines of the shafts 27 to 30 directly below (or above) the center line 22 or, as viewed on plan, between the center line 22 and the plane 3. In these alternative positions the shaft 30 can also be used as a power take-off shaft. In addition when in one of the turned positions of the unit identified by reference numerals 24 to 30, a satisfactory disposition with respect to an attached machine is obtained. This movability of the unit 24 to 30 in the direction towards or away from the plane 30 is possible because the housing 24 projects significantly from the housing 23 away from the center line 22 on one side. The use of such a pivotable power take-off shaft 30 is, in principle, not confined to the region between the front wheels 9 and the rear wheels 11, since it may also be used at the front rear of the tractor or both.

As shown in FIG. 2, the shaft 21 journalled in the housing 23 projects to the rear where it is enclosed in a tubular supporting piece 31. The supporting piece 31 is secured at its front end to the rear of the housing 23 and at its rear end to the front of a gear box 32 disposed on one side of the plane 3 and, as viewed from the side, directly behind the rear of the engine 17. The gear box 32 (FIG. 4) comprises a plurality of meshing gear wheels disposed parallel to each other in a plane normal to the plane 3. Near the outboard side of the gear box 32 there is a gear wheel 33 which is fastened to the shaft 21. The gear wheel 33 is in mesh with a larger gear wheel 34 fastened to a substantially horizontal shaft 35 extending parallel to the plane 3, and the gear wheel 34 is in mesh with a gear wheel 35A of the same size fastened to a shaft 36 extending parallel to the shaft 35. The gear wheel 35A is disposed near the inboard end of the gear box 32. Apart from the wheels 33, 34 and 35A, gear wheels 37 and 38 having a smaller diameter than the gear wheel 33 are in mesh with the gear wheel 33. The shafts 21, 35 and 36 lie in a common horizontal plane, and the shafts of the gear wheels 37 and 38 lie respectively above and below that plane (FIG. 4). The gear wheels 37 and 38 are fastened to shafts 39 and 40 respectively, which project rearwardly from the gear box 32 and which constitute input shafts of hydraulic pumps 41 and 42 respectively which are fastened to the rear of the gear box 32. The transmission ratio from the output shaft 18 of the engine 17 is such that the shafts 39 and 40 are driven at a speed of rotation of about 3200 rev/min. At a speed of rotation of about 2000 rev/min of the gear wheel 33 the gear wheels 34 and 35A each have a speed of 1000 rev/min. The shafts 35 and 36 of the gear wheels 34 and 35A project from the rear of the box 32 and constitute input shafts of clutches 43 and 44 respectively (FIG. 2), which are actuable from the cab 16 and which are similar to the clutch 29. The clutches 43 and 44 have output shafts 45 and 46 respectively which project to the rear. The output shaft 45 is coupled by an auxiliary shaft 47 including two universal joints with an input shaft of a gear box 48, which has a rearwardly projecting output shaft 49 serving as a power take-off shaft. The gear box 48 can be changed stepwise from the cab 16 and may comprise a manually operated automobile gear box. The transmission ratios of the gear box 48 are such that with an output speed of the shaft 45 of 1000 rev/min the power take-off shaft 49 can be selectively driven at 1000, 600, 450 or 350 rev/min so that the machine driven by the power take-off shaft 49 can be driven with speeds adjusted to suit the prevailing conditions, for example, in the case of rotary harrows, to suit the soil structure in conjunction with the travelling speed of the machine. The gear box 48 and the power take-off shaft 49 are disposed to one side of the plane 3, in the region of the lateral boundary of the frame 1. The gear box 48 is fastened to the top of one of the frame beams 2 and of the transverse beam 6 situated approximately at the level of the wheel axles of the wheels 9 and 11.

The output shaft 46 of the gear box 32 is directly coupled by an auxiliary shaft 50 having two universal joints with a power take-off shaft 51, which also projects to the rear. The power take-off shaft 51 is journalled in a bearing fastened to the top of the beam 6. The center line of the power take-off shaft 51 is located in the plane 3 and the shaft can be driven at 1000 rev/min.

Pivotal shafts 52 are fastened to the tie beam 6 on both sides of the power take-off shaft 51. These shafts 52 are in line with each other and at right angles to the plane 3. A lower lifting arm 53 of a three-point lifting device 54 is pivotable about each of the pivotal shafts 52. The upper lifting arm 55 of the lifting device 54 is pivotable about a pivotal shaft 56 at right angles to the plane 3 and journalled in two supports mounted on the transverse beam 6. The lifting device 54 can be hydraulically actuated in known manner from the cab 16. The lifting arms 53 and 55 are provided at their free ends with coupling members for attaching one or more machines or implements, these members being designed in the form of hooks which open inwardly and downwardly respectively. Since the lifting device 54 is arranged symmetrically with respect to the plane 3, the power take-off shaft 51, which is drivable at a speed of 1000 rev/min from the coupling 44, is disposed, as viewed on plan, between the lifting arms 53, and the power take-off shaft 49 is located outside the adjacent lifting arm 53.

At the front of the tractor there is a lifting device 57 which is releasably fastened to the tie plate 8. A U-shaped carrier 58 is bolted to the tie plate 8 (FIG. 2). A pivotal shaft 59 is provided near the front of each limb of the carrier 58 and extends at right angles to the plane 3. A holder 60 is pivotable about the pivotal shafts 59 by a hydraulic cylinder 61, which can be actuated from the cab 16. At the front, the holder 60 carries two channel-section guide beams 62 situated one on each side of, and spaced from, the plane 3. The open sides of the two beams 62 face each other. Two rollers 63 are displaceable along the length of each of the two guide beams 62. On their sides facing each other, the rollers 63 are mounted in a framework 64, which is movable up and down on the rollers 63 inside the two guide beams 62 by means of a hydraulic ram 65, the underside of which bears on the holder 60, while the end of the piston rod is connected with the top of the framework 64. The hydraulic ram 65 can also be actuated from the cab 16. At its lower corners and at a higher, central, position, the framework 64 has hooks which are open at the top and serve as coupling members for machines or implements to be attached. The higher hook is located in the plane 3 and serves as a top fastening point of the lifting device 57.

Near the front ends of the carriers 7 there is a steering shaft 66 which extends for most of its length below the carriers 7 and is directed vertically or slopes slightly towards the front from top to bottom. The steering shaft 66 is mainly a cylindrical pipe, the center line of which coincides with the pivotal axis 10. The steering shaft 66 is surrounded near its top end by a bearing 67 supported by the underside of the two carriers 7. The center line 10 of the steering shaft 66 is located in the plane 3.

The bearing 67 comprises a plurality of horizontal plates 68 which are clamped one on top of the other by bolts, the top plate being releasably fastened to the undersides of the carriers 7. These plates 68, which receive at least most of the load on the steering shaft 66, may be made from wear-resistant material. Despite the fact that wear-resistant material can, in general, be welded only with difficulty, the bearing can be readily exchanged by composing it from stacked plates.

At its lower end, the steering shaft 66 is releasably connected with a tubular support 69, the center line of which intersects the center line 10 at right angles. The tubular support 69 is symmetrical to the plane 3 in the straight-ahead position of the front wheels 9, as shown. A hydraulic wheel motor 70 is rigidly secured to each end of the tubular support 69. The output shafts of these wheel motors 70 coincide with the rotary axes of the front wheels 9 which are fastened to these output shafts. The steering shaft 66 extends through the bearing 67 into the space between the two carriers 7, where it is provided with a lever 71 (FIG. 2), which projects laterally in the straight-ahead position of the front wheels 9. The free end of the lever 71 is connected with the end of the piston rod of a hydraulic cylinder 72, which is pivotable about a substantially vertical pivotal shaft 73 journalled inside one of the carriers 7. By actuating the hydraulic cylinder 72 from the cab 16, the lever 71 and hence the steering shaft 66 can turn the tubular support 69 together with the wheel motors 70 and the front wheels 9 about the center line 10 out of the straight-ahead position through an angle of about 75° to each side, i.e. through a total angle of about 150°. This large arc of motion is not hindered by the frame since, as is shown in the side elevation of FIG. 1, it extends above the front wheels.

An alternative embodiment of the connection of the front wheels 9 with the steering shaft 66 is shown in FIG. 6 and comprises a pivotal joint between the support 69 and the steering shaft 66 by means of a horizontal pivotal shaft 69A located in the plane 3. This connection has the advantage that during operation all wheels 9 and 11 always make contact with the ground so that the ground pressure of all wheels is maintained. This is important for the steerability of the front wheels 9. Moreover, the engine 17 located near the front provides an effective load on the two front wheels.

The outboard sides of the rear ends of the two frame beams 2 are provided with tubular supports 74, which extend outwardly from the associated frame beam and support hydraulic wheel motors 76. The center lines of the supports 74 coincide with the wheel axis 12 of the rear wheels 11. Each of the tubular supports 74 is rigidly supported on its frame beam 2 by a lateral strut 75, which projects forwardly and inwardly away from the associated support. The struts 75 and the lateral supports 74 transfer the reactive force of the driving torque exerted on the rear wheels 11 during operation to the sides of the frame beam 2 at relatively spaced points, the arrangement being such that each strut 75 is fastened to a point of the frame beam 2 where the hollow beam 6 is welded to said frame beam.

A wheel motor 76 is rigidly secured to the outermost end face of each tubular support 74. Each wheel motor 76 extends outwardly away from its support 74, and the center line of the output shaft of each wheel motor, provided at the end remote from the support 74, coincides with the wheel axis 12 of the rear wheels 11. The frame 1, the supports 74 and the wheel motors 76 as well as the rear wheels 11 are proportioned so that, as viewed in the direction A, the inner boundary faces of the rear wheels 11 are at a short distance outside the outer faces of the front wheels 9. This distance is at the most about one quarter of the diameter of the wheels. The power take-off shaft 30 is situated, at least in the illustrated position, in front of one of the rear wheels 11.

One of the two hydraulic pumps 41 or 42 feeds the two hydraulic wheel motors 76 of the rear wheels 11, and the other hydraulic pump is coupled with the hydraulic wheel motors 70 of the front wheels 9. The two hydraulic pumps 41 and 42 have a variable fluid displacement determined by the driver, which displacement can be adjusted by means of a known swashplate which can be operated from the cab. The diagram of FIG. 5 represents a hydraulic circuit arrangement between, for example, the pump 41 and the wheel motors 70 of the front wheels 9. A similar arrangement is also provided for the hydraulic pump 42 and the wheel motors 76 for the rear wheels 11 so that this hydraulic arrangement is duplicated in the tractor. The pump 41 feeds one wheel motor 70 through a valve 77, arranged in the cab 16 within reach of the driver's hand, and through a duct 78. The outlet duct 79 of the motor 70 communicates through the valve 77 with a duct 80 feeding the other wheel motor 70. The outlet duct 81 of the latter motor 70 communicates through the valve 77 and a duct 82 with a fluid reservoir 83. In the illustrated position of the valve 77, the wheel motors 70 are arranged in series. When the driver shifts the valve 77 to its other position, the pressurized fluid is passed from the pump 41 through the ducts 78 and 80 to the two wheel motors 70 and through the ducts 79 and 81 and the duct 82 to the reservoir 83. In this case the two motors 70 are arranged in parallel. The same arrangement applies to the pump 42 and the wheel motors 76.

The duct 78 is in all cases a high pressure duct. The duct 78 is branched through a duct 84 to an adjustable, commercially available electric switch 85, which is open at a relatively low hydraulic pressure in the ducts 78 and 84, and closes when the limit value of the hydraulic pressure is attained. This limit value is adjustable by means of the switch 85. The switch 85 is grounded to the mass of the tractor and connected through a signal producer 86 (for example, a buzzer or a light signal) and a switch 87 (for example, the ignition switch of the tractor) to the positive terminal of an battery 88 of the tractor.

The above-described possibility of connecting the two wheel motors of the rear wheels 11 and the two wheel motors of the front wheels 9 in series or in parallel from the cab is important in the event of unfavorable soil conditions, when one of the two wheels slips or tends to slip, since it is desirable for the other wheel to remain capable of exerting a driving force on the ground. In this case the wheel motors 70 and/or 76 are arranged in series. During normal operation the wheel motors 70 and 76 are arranged in parallel with regard to, inter alia, driving through bends.

Apart from the arrangement described above, the circuit shown in FIG. 5 can be used to control the wheels on one side of the tractor, another similar arrangement controlling the wheels on the other side of the tractor, it being possible to change over from the first to the latter arrangement and conversely.

The switch 85 may be constructed in the form of a safety valve, in conjunction with the signal generator 86. In this case the pressure in the ducts 78, 84 cannot exceed the set limit value.

During operation it is desirable to have, under all conditions, a proportion of the power or the driving torque of the driving engine 17 at one's disposal for driving machines or implements from the foremost power take-off shaft 30 and/or the hindmost power take-off shaft 51 (both 1000 rev/min) and/or the hindmost power take-off shaft 49 (100, 600, 450 and 350 rev/min). This means that the power or torque respectively required for the propulsion of the tractor and the machinery attached thereto must not exceed a given part of the maximum power or torque of the engine 17. The power of the driving engine 17 in this embodiment is about 100 kW. The hydraulic pressure in the duct 78 (FIG. 5) provides a measure of the power or the torque absorbed in propelling the tractor and the attached machinery or implements. When the hydraulic pressure in the ducts 78 and 84 reaches a given limit value, (corresponding to, for example, 50 kW), the electric switch 85 closes and the signal generator 86 arranged in the cab produces a signal so that the driver will know that the minimum value of the proportion of the power available for driving the attached machinery under any condition has been reached and that this proportion (100−50=50 kW in this example) may tend to drop below the predetermined minimum value. The driver can then take steps to reduce the power required for propulsion, for example, by reducing the travelling speed by means of the pumps 41 and 42 and/or, when for example a soil cultivating machine is attached, he can slightly lift the front and/or rear lifting device so that the ground resistance of the machine decreases. As soon as the power or torque used for propulsion gets again below the limit value, the signal generator 86 stops because the pressure in the ducts 78 and 84 has dropped. It can thus be ensured in a simple manner that there is always a given proportion of the engine power available for driving attached machinery. Therefore, in principle substantially the entire engine power or torque is available at the power take-off shafts (when the propulsion power is very low or zero) and the power take-off drives are constructed for this power or torque.

In the space between the rear of the engine 17 and one of the rear wheels 11 there is a fuel tank 89 which is fastened to one side of the tractor, while the reservoir 83 for hydraulic fluid is arranged between the pumps 41 and 42 fastened to the gear box 32 and the adjacent rear wheel on the side opposite the fuel tank 89. The reservoirs 83 and 89 are located for the major part below the cab 16.

The overall length of the tractor is at least about five meters, and the overall width of the tractor is about three meters. The weight of the tractor is about three thousand kilograms.

Although various features of the inventor described and illustrated in the drawings, will be set forth in the following claims as inventive features, the invention is not necessarily limited to these features and may encompasses all disclosed features both individually and in various combinations.

I claim:

1. A motor vehicle comprising an engine, a frame which supports the engine, forward and rear ground wheels supporting said frame, at least one lifting device and a power take-off shaft which is drivable by the engine and which extends in the intended direction of normal operative travel of the vehicle and is disposed at one side of the vehicle, the power train between said engine and said shaft being disposed between said forward and rear ground wheels as seen from the side, and means for adjusting the lateral position of said power take-off shaft relative to its distance from the vehicle's longitudinal centerline, said power take-off shaft being arranged to extend beyond the vehicle's side so that auxiliary shafts from machines or implements attached to the vehicle and having a working width extending beyond the vehicle can be coupled with said power take-off shaft without being substantially misaligned with said power take-off shaft.

2. A motor vehicle as claimed in claim 1, in which the power take-off shaft is farther from the vertical longitudinal central plane of the vehicle than is the outer surface of a front wheel of the vehicle.

3. A motor vehicle as claimed in claim 1, in which the distance between the power take-off shaft and the vertical longitudinal central plane of the vehicle is about one hundred centimeters.

4. A motor vehicle as claimed in claim 1, comprising means for distributing power output from said engine between propulsion for the tractor and said power take-off shaft which is adapted to provide optionally that the entire power of the engine is available at the power take-off shaft.

5. A motor vehicle as claimed in claim 1, in which the power take-off shaft power is about one hundred kilowatts.

6. A motor vehicle as claimed in claim 1, in which the power take-off shaft is pivotable about a pivotal axis and is fixable in any one of a plurality of positions.

7. A motor vehicle as claimed in claim 6, in which the pivotal axis is substantially horizontal and parallel to the vertical longitudinal central plane of the vehicle.

8. A motor vehicle as claimed in claim 6, in which the pivotal shaft is spaced from the vertical longitudinal central plane of the vehicle.

9. A motor vehicle as claimed in claim 7, in which as viewed on plan, the pivotal shaft is disposed outside the frame.

10. A motor vehicle as claimed in claim 1, in which the power take-off shaft is directed towards the front, with respect to the intended direction of normal operative travel of the vehicle.

11. A motor vehicle as claimed in claim 1, in which the power take-off shaft is directed towards the rear with respect to the intended direction of normal operative travel of the vehicle.

12. A motor vehicle as claimed in claim 1, in which the power take-off shaft is disposed near one end of the vehicle.

13. A motor vehicle as claimed in claim 1, in which the power take-off shaft is suitable for driving a machine or implement attached to the lifting device.

14. A motor vehicle as claimed in claim 1, in which the power take-off shaft is one of a group of such shafts, the group comprising one forward power take-off shaft and two rear power take-off shafts.

15. A motor vehicle as claimed in claim 14, in which at least one of the power take-off shafts can be driven at 1000 rev/min.

16. A motor vehicle as claimed in claim 14, in which at least one of the power take-off shafts can be driven at any one of four different speeds of rotation.

17. A motor vehicle as claimed in claim 16, in which the four different speeds are 1000, 600, 450 and 350 rev/min.

18. A motor vehicle as claimed in claim 1, in which the vehicle comprises four wheels and, as viewed from the front, the width measured across the wheels is about three meters, the maximum space between two wheels being not more than thirty centimeters.

19. A motor vehicle as claimed in claim 18, in which the wheels are provided with low-pressure tires.

20. A motor vehicle as claimed in claim 18, in which the width of the tyres is about sixty centimeters.

21. A motor vehicle as claimed in claim 19, in which the diameter of all tires is about 135 centimeters.

22. A motor vehicle as claimed in claim 19, in which, as viewed from the front, the distance between two said tires is smaller than one quarter of the diameter of either said.

23. A motor vehicle as claimed in claim 1, in which the engine has a power of about one hundred kilowatts and four pneumatic tyres are provided each having a width of about sixty centimeters.

24. A motor vehicle as claimed in claim 1, in which two front wheels are provided which are relatively close to each other and two rear wheels are provided which, as viewed from the front, are disposed one on each side of the front wheels.

25. A motor vehicle as claimed in claim 1, which comprises two wheels provided with respective hydraulic motors, the wheels being steerable together about an upwardly directed axis and being pivotable together with respect to the upwardly directed axis about a substantially horizontal pivotal axis extending in the intended direction of normal operative travel of the vehicle.

26. A motor vehicle as claimed in claim 1, in which at least some of the wheels of the tractor can be hydraulically driven and in that a signal generator is provided near the driver's seat, the signal generator becoming operative when a pressure occurring in the hyraulic system exceeds a predetermined value.

27. A motor vehicle as claimed in claim 1, in which the wheels are drivable in groups by an adjustable hydraulic pump.

28. A motor vehicle as claimed in claim 26, in which a sensor is provided near the driver's seat to generate a signal when the hydraulic pressure on the high-pressure side of the motor exceeds a predetermined value which represents a predetermined proportion of the hydraulic pressure corresponding to the maximum power (torque) of the engine.

29. A motor vehicle as claimed in claim 28, in which the sensor is a hydraulically actuable, adjustable, electric switch.

30. A motor vehicle as claimed in claim 28, in which the sensor is a hydraulic safety valve.

31. A motor vehicle as claimed in claim 1, in which the length of the vehicle is at least five meters, the width is about three meters, and the vehicle weight is about three thousand kilograms.

32. A motor vehicle as claimed in claim 1, which is an agricultural tractor.

33. A motor vehicle comprising an engine supported by a frame, four ground wheels interconnected to and supporting said frame, a hydraulic pump driven by said engine, separate hydraulic motors driving at least two of said wheels, a hydraulic circuit from said pump to said motors, valve means in said hydraulic circuit controllable by the operator of the vehicle which is adapted to supply hydraulic fluid to each said motor for operating same selectively either in series to prevent wheel slippages under unfavorable soil conditions or in parallel for normal operations.

34. A motor vehicle comprising an engine supported by a frame, forward wheels and rear wheels interconnected to and supporting said frame, a power take-off shaft drivable by said engine extending from one side of the tractor between said forward and said rear wheels on that side, said power take-off shaft being adapted to drive implements connected to the vehicle and extending normally outboard relative to that side of the vehicle, a fuel tank for said engine supported by said frame on the other side of said tractor, said fuel tank being spaced outboard from the tractor's longitudinal centerline and entirely located on said other side which is opposite to said one side on which said power take-off shaft is located and which is between said forward and said rear wheels on such other side.

35. A motor vehicle as claimed in claim 34 wherein said engine is an internal combustion engine having a crankshaft, the axis of rotation of said crankshaft extending normally relative to the longitudinal centerline of the tractor.

* * * * *